US012147827B2

(12) United States Patent
Onda et al.

(10) Patent No.: US 12,147,827 B2
(45) Date of Patent: Nov. 19, 2024

(54) VEHICLE CONTROL DEVICE, VEHICLE CONTROL METHOD, AND RECORDING MEDIUM RECORDING CONTROL PROGRAM

(71) Applicant: TOYOTA JIDOSHA KABUSHIKI KAISHA, Toyota (JP)

(72) Inventors: Yusuke Onda, Tokyo-to (JP); Takeshi Yamamoto, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 564 days.

(21) Appl. No.: 17/504,562

(22) Filed: Oct. 19, 2021

(65) Prior Publication Data

US 2022/0179676 A1 Jun. 9, 2022

(30) Foreign Application Priority Data

Dec. 8, 2020 (JP) .................................. 2020-203435

(51) Int. Cl.
*G06F 9/455* (2018.01)
*G06F 8/61* (2018.01)
*G06F 8/71* (2018.01)
*G06F 21/57* (2013.01)

(52) U.S. Cl.
CPC ............ *G06F 9/45558* (2013.01); *G06F 8/63* (2013.01); *G06F 8/71* (2013.01); *G06F 21/57* (2013.01); *G06F 2009/4557* (2013.01); *G06F 2009/45583* (2013.01); *G06F 2009/45587* (2013.01); *G06F 2009/45591* (2013.01)

(58) Field of Classification Search
CPC ....... G06F 9/45558; G06F 2009/45587; G06F 21/53; G06F 21/50; G06F 21/71; G06F 2009/4557; G06F 2009/45583; G06F 2009/45591; G06F 21/57; G06F 21/575; G06F 21/64
See application file for complete search history.

(56) References Cited

U.S. PATENT DOCUMENTS 11,481,482 B2* 10/2022 Mookken ................. G06F 21/51
2010/0023702 A1 1/2010 Landau et al.
2011/0145358 A1 6/2011 Landau et al.
2011/0219372 A1* 9/2011 Agrawal ................. H04L 67/06
718/1

(Continued)

FOREIGN PATENT DOCUMENTS

JP 5236367 B2 7/2013

*Primary Examiner* — Jacob D Dascomb
(74) *Attorney, Agent, or Firm* — Oliff PLC

(57) ABSTRACT

A vehicle control device includes a re-use determination section and a verification section. When the software of a virtual machine is to be verified, the re-use determination section decides, in accordance with an index assigned beforehand to the virtual machine, whether or not to re-use a verification result of common software that has been obtained in verification of the software of another virtual machine. When the re-use determination section decides to re-use the verification result of the common software obtained in the verification of the software of the other virtual machine, the verification section re-uses the verification result of the common software obtained in the verification of the software of the other virtual machine and verifies VM software of the virtual machine.

13 Claims, 12 Drawing Sheets

(56) References Cited

U.S. PATENT DOCUMENTS

| | | | |
|---|---|---|---|
| 2011/0321065 A1* | 12/2011 | Gopalakrishnan | G06F 9/4411 |
| | | | 718/1 |
| 2017/0364685 A1* | 12/2017 | Shah | G06F 21/575 |
| 2019/0354675 A1* | 11/2019 | Gan | G06F 11/0712 |
| 2023/0244780 A1* | 8/2023 | Hanrieder | G06F 8/36 |
| | | | 718/1 |

* cited by examiner

VEHICLE CONTROL DEVICE, VEHICLE CONTROL METHOD, AND RECORDING MEDIUM RECORDING CONTROL PROGRAM

CROSS-REFERENCE TO RELATED APPLICATION

This application is based on and claims priority under 35 USC 119 from Japanese Patent Application No. 2020-203435 filed on Dec. 8, 2020, the disclosure of which is incorporated by reference herein.

BACKGROUND

Technical Field

The present disclosure relates to a control device of a vehicle, a control method of a vehicle, and a recording medium recording a control program.

Related Art

Development has been conducted to integrate the functions of ECUs of a vehicle as software at a single control device. For example, Japanese Patent No. 5,236,367 discloses a technology that shares program modules between virtual machines (VMs), shortening startup durations of the VMs and saving memory.

Execution of plural kinds of software with the functions of ECUs of a vehicle at a single control device is implemented by configuring plural VMs. At a time of startup of an ECU, the authenticity of software required for configuring that VM is verified. Therefore, when the number of VMs increases, the time needed to verify authenticity increases proportionally, and a duration until startup of all the VMs is completed increases.

SUMMARY

An object of the present disclosure is to provide a vehicle control device, a vehicle control method and a recording medium recording a control program that, by re-using a result of verification of software shared by plural virtual machines (VMs), shortens the duration needed for verifying the software of the plural VMs.

Solution to Problem

A first aspect is a vehicle control device including: a memory section that stores virtual machine (VM) software which is software of plural VMs that control equipment installed at a vehicle and common software that is shared by at least two of the VMs; and a verification section that, when verifying VM software of one of the VMs, re-uses a verification result of the common software in accordance with an index assigned beforehand to the one VM, the verification result being obtained in verification of VM software of another of the VMs.

In the vehicle control device according to the first aspect, the VM software, which is software of a plural number of VMs that control equipment mounted at the vehicle, and the common software, which is shared by two or more of the VMs, are memorized at the memory section. In this vehicle control device, when the software of each VM is to be verified by the verification section, a verification result of the common software that has been obtained in verifying the software of another of the VMs is re-used, depending on the index assigned beforehand to the each VM. As a result, a duration needed to verify the software of the plural VMs may be shortened by an amount corresponding to duplications of authentication of the common software. That is, the duration needed for verifying the software of the plural VMs may be shortened by re-using a result of verification of software that is shared by a plural number of the VMs.

In a vehicle control device according to a second aspect, the vehicle control device according to the first aspect further includes a re-use determination section that, when the verification section verifies the VM software of the one VM, decides whether or not to re-use the verification result of the common software obtained in the verification of the VM software of the other VM in accordance with the index assigned beforehand to the one VM. The verification section, when the re-use determination section decides to re-use the verification result of the common software obtained in the verification of the VM software of the other VM, re-uses the verification result of the common software obtained in the verification of the software of the another VM and verifies the VM software of the one VM and, when the re-use determination section decides not to re-use the verification result of the common software obtained in the verification of the VM software of the other VM, verifies the VM software of the one VM and verifies the common software. Therefore, when the decision is made to re-use a verification result of the common software that is obtained in verifying the VM software of another of the VMs, verification of the common software is not duplicated. As a result, the duration needed for verifying the software of the plural VMs may be shortened.

In a vehicle control device according to a third aspect, in the vehicle control device according to the first aspect or the second aspect, the verification section verifies authenticity of the VM software of the VMs. Therefore, a duration needed for verifying the authenticity of the software of the plural VMs may be shortened. The meaning of the term "verifies authenticity" as used herein is intended to include verifying that the software has not been tampered with.

In a vehicle control device according to a fourth aspect, in the vehicle control device according to any one of the first to third aspects, the verification section verifies the VM software of the VMs when starting the VM software of the plural VMs. Therefore, a duration needed for starting the software of the plural VMs may be shortened. The meaning of the term "starting the software of the . . . VMs" as used herein is intended to include reading and loading the VM software and common software of the VMs from the memory section.

In a vehicle control device according to a fifth aspect, in the vehicle control device according to any one of the first to fourth aspects, the index is one of a functional safety index relating to functional safety of equipment controlled by the one VM or a security index relating to security of the VM software of the one VM. Therefore, shortening the duration needed for verifying the software of the plural VMs may be compatible with the functional safety of the equipment controlled by the VMs or the security of the software of the VMs.

A sixth aspect is a vehicle control method including verification processing executed by a computer including a memory section, the memory section storing virtual machine (VM) software which is software of plural VMs that control equipment installed at a vehicle and common software that is shared by at least two of the VMs, and the verification processing including, when verifying VM software of one of the VMs, re-using a verification result of the common software in accordance with an index assigned beforehand to the one VM, which verification result is obtained in verification of VM software of another of the VMs.

According to the vehicle control device according to the sixth aspect, when the VM software of each VM is to be verified in the step of verifying, a verification result of the common software that has been obtained by verifying the VM software of another of the VMs is re-used, depending on the index assigned beforehand to the each VM. As a result, a duration needed to verify the software of the plural VMs may be shortened by an amount corresponding to duplications of authentication of the common software. That is, the duration needed for verifying the software of the plural VMs may be shortened by re-using a result of verification of software that is shared by a plural number of the VMs.

A seventh aspect is a non-transitory recording medium storing a control program executable by a computer to execute verification processing, the computer including a memory section memorizing VM software that is software of plural VMs that control equipment installed at the vehicle and common software that is shared by at least two of the VMs, and the verification processing including, when verifying VM software of one of the VMs, re-using a verification result of the common software in accordance with an index assigned beforehand to the one VM, which verification result is obtained in verification of VM software of another of the VMs.

According to the non-transitory recording medium storing a control program according to the seventh aspect, when the software of each VM is to be verified in the step of verifying, a verification result of the common software that has been obtained by verifying the VM software of another of the VMs is re-used, depending on the index assigned beforehand to the each VM. As a result, a duration needed to verify the software of the plural VMs may be shortened by an amount corresponding to duplications of authentication of the common software. That is, the duration needed for verifying the software of the plural VMs may be shortened by re-using a result of verification of software that is shared by a plural number of the VMs.

According to the present disclosure, a duration needed for verifying software of plural VMs may be shortened by re-using a result of verification of software shared by the plural VMs.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
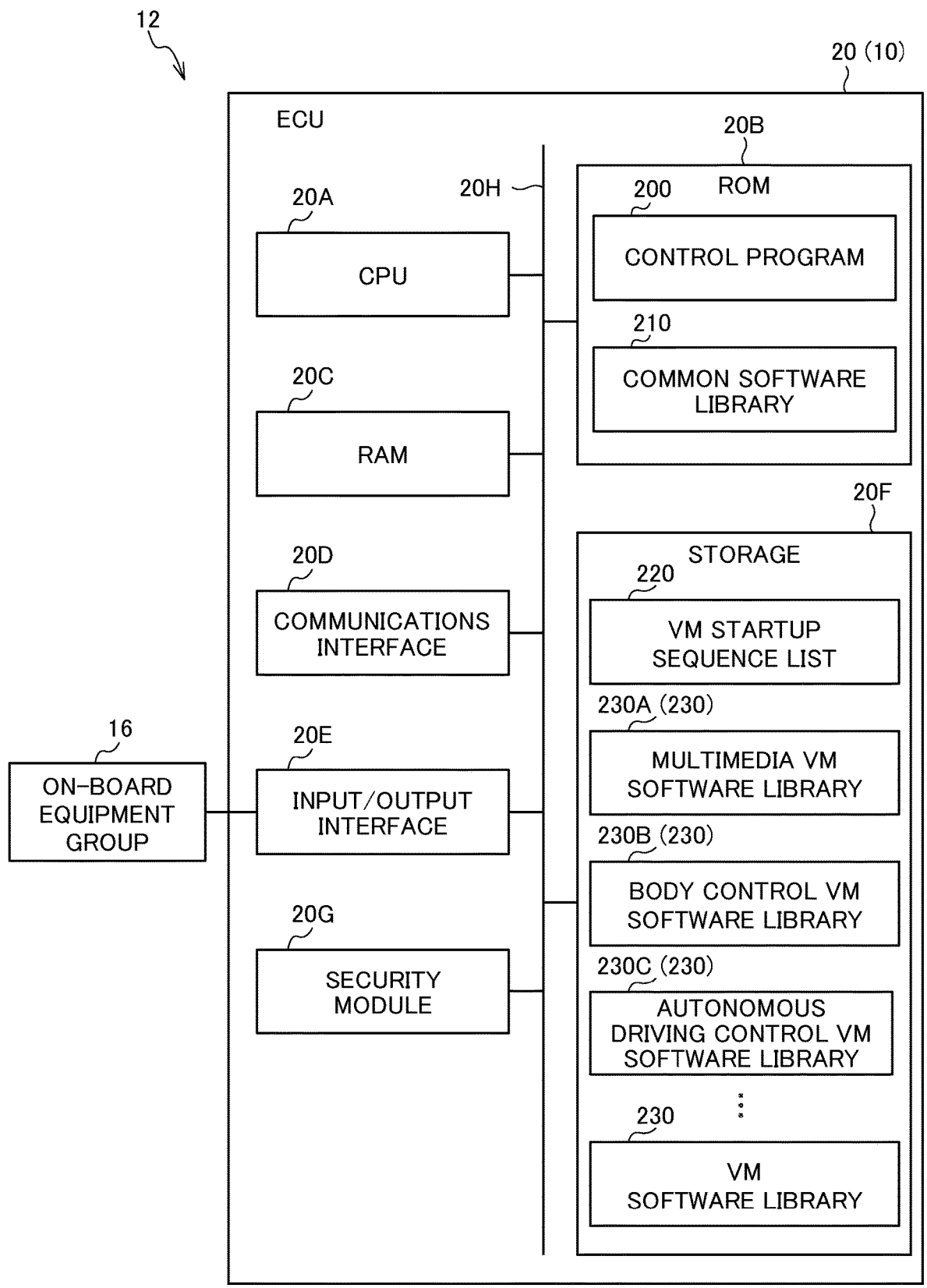
FIG. 1 is a block diagram showing hardware structures of a vehicle according to a first exemplary embodiment.

FIG. 1 is a block diagram showing hardware structures of a vehicle 12 according to a first exemplary embodiment.
—Structures—

As shown in FIG. 1, the vehicle 12 according to the first exemplary embodiment includes an electronic control unit (ECU) 20, which serves as a vehicle control device (below referred to simply as "the control device") 10, and an on-board equipment group 16 connected to the ECU 20. The on-board equipment group 16 includes sensors provided at the vehicle 12, including sensors mounted at body parts and engine parts. The on-board equipment group 16 further includes driving devices provided at the vehicle 12, including motors, valves and actuators mounted at body parts and engine parts.

The ECU 20 includes a central processing unit (CPU) 20A, read-only memory (ROM) 20B, random access memory (RAM) 20C, a communications interface 20D, an input/output interface 20E, storage 20F and a security module 20G. The CPU 20A, ROM 20B, RAM 20C, communications interface 20D, input/output interface 20E, storage 20F and security module 20G are connected to be capable of communications with one another via a bus 20H. The CPU 20A referred to herein is an example of a processor.

The CPU 20A is a central arithmetic processing unit that executes various programs and controls respective parts. That is, the CPU 20A reads a program from the ROM 20B and executes the program, using the RAM 20C as a workspace. In the present exemplary embodiment, a plural number of the CPU 20A may be provided (a multiprocessor configuration), and the CPU 20A may include plural cores (a multicore configuration).

The ROM 20B memorizes various programs and various kinds of data. A control program 200 is memorized at the ROM 20B according to the present exemplary embodiment. The control program 200 is a program that conducts startup processing, which is described below. A common software library 210 that is shared by plural VMs is also memorized at the ROM 20B.

The RAM 20C serves as a work area and temporarily memorizes programs and data.

The communications interface 20D is an interface for connecting with other devices provided in the vehicle 12. The interface uses a communications standard according to Controller Area Network (CAN), Ethernet (registered trademark) or the like.

The input/output interface 20E is an interface for communicating with the on-board equipment group 16 mounted at the vehicle 12.

The storage 20F memorizes a VM startup sequence list 220. The VM startup sequence list 220 is a list that designates a startup sequence of the VMs when the VMs are being started. In the VM startup sequence list 220, an index specified beforehand is assigned to each VM. The index that is employed is, for example, a system safety requirement level needed for each VM. The system safety requirement level is a level of safety found for the VM from a combination of the kinds of problems that may be caused by misoperation, malfunction or the like of the ECU and probabilities of occurrence of the problems. In the automotive field, levels of safety for electronic control systems of vehicles are defined in ISO26262 as Automotive Safety Integrity Levels (ASIL). More specifically, a system safety requirement level of "High" is assigned to a VM with which a system problem may cause a hazard to people or damage to objects. In contrast, a system safety requirement level of "Low" is assigned to a VM with which system safety is not necessary, which is to say a VM with which a system problem has no possibility of causing a hazard to people or damage to objects. A system safety requirement level level of "Medium" is assigned to other VMs.

The storage 20F memorizes at least two VM software libraries 230 for configuring corresponding VMs. The two or more VM software libraries 230 include, for example, a multimedia VM software library 230A for configuring a multimedia VM, which is described below, a body control VM software library 230B for configuring a body control VM, which is described below, and an autonomous driving control VM software library 230C for configuring an autonomous driving control VM, which is described below. The VM software libraries 230 include further VM software libraries 230 according to purposes.

The storage 20F is realized by ROM, a hard disk or any of various Flash devices (a solid-state drive (SSD), embedded MultiMedia Card (eMMC), Secure Digital (SD) or the like).

The security module 20G verifies the authenticity of software with hardware and is, for example, a Trusted Platform Module (TPM) or Hardware Security Module (HSM). The security module 20G conducts encryption and decryption using stored keys and encryption and decryption accelerators, and performs hash value calculations and the like to verify the authenticity of software.

Figure 2:
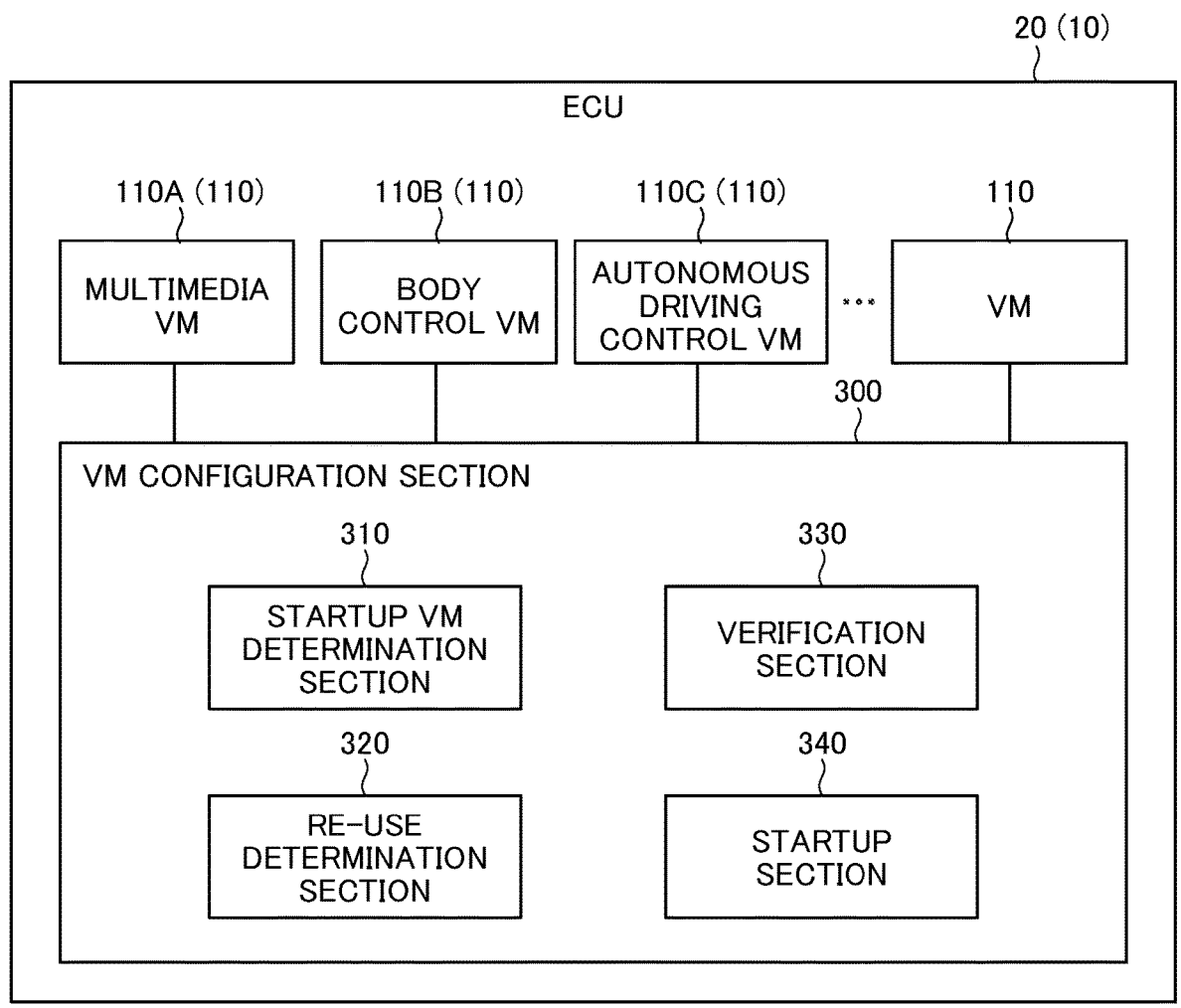
FIG. 2 is a block diagram showing an example of functional structures of the vehicle according to the first exemplary embodiment.

FIG. 2 is a block diagram showing an example of functional structures of the ECU 20. These functional structures are realized by the CPU 20A reading and executing the control program 200 memorized at the ROM 20B.

As shown in FIG. 2, the ECU 20 includes at least two VMs 110 and a VM configuration section 300. The VMs 110 include, for example, a multimedia VM 110A, a body control VM 110B and an autonomous driving control VM 110C.

The VMs 110 to be realized at the ECU 20 are not limited thus and may include further VMs 110 according to purposes.

The VM configuration section 300 includes functions for virtually configuring the VMs 110. The VM configuration section 300 is realized by the functions of a "hypervisor". At a time of startup, the VM configuration section 300 reads the VM startup sequence list 220 from the storage 20F and, in accordance with the startup sequence designated by the VM startup sequence list 220, reads the VM software libraries 230 and common software library 210 and starts the VMs 110. More specifically, the VM configuration section 300 loads the VM software libraries 230 and the common software library 210 into the RAM 20C and starts the VMs 110.

The VM configuration section 300 further includes a startup VM determination section 310, a re-use determination section 320, a verification section 330 and a startup section 340.

The startup VM determination section 310 determines which VM 110 is to start, in accordance with the startup sequence designated by the VM startup sequence list 220, and acquires the system safety requirement level of that VM 110.

When the VM software library 230 of each VM 110 is to be verified, depending on the system safety requirement level assigned beforehand to the VM 110, the re-use determination section 320 makes a determination as to whether to re-use a verification result of the common software library 210 that has been obtained at a time of verification of the VM software library 230 of another of the VMs 110. More specifically, when the system safety requirement level of the VM 110 is High, the re-use determination section 320 decides not to re-use a verification result of the common software library 210. For example, the system security requirement level High is assigned to the body control VM 110B. Therefore, the re-use determination section 320 decides not to re-use a verification result of the common software library 210 for the body control VM 110B.

When the system safety requirement level of the VM 110 is Medium, the re-use determination section 320 decides to re-use a verification result of the common software library 210 obtained at the time of verification of the VM software library 230 of another of the VMs 110. For example, the system safety requirement level Medium is assigned to the autonomous driving control VM 110C. Therefore, the re-use determination section 320 decides to re-use a verification result of the common software library 210 for the autonomous driving control VM 110C.

When the system safety requirement level of the VM is Low, the re-use determination section 320 decides not to conduct verification of the VM software library 230 of that VM 110. For example, the system safety requirement level Low is assigned to the multimedia VM 110A. Therefore, the re-use determination section 320 decides not to conduct verification of the multimedia VM software library 230A.

When a plural number of the VMs 110 are starting up, the verification section 330 verifies the authenticity of the VM software library 230 of each VM 110. When the re-use determination section 320 decides not to re-use a verification result of the common software library 210 that has been obtained at the verification of the VM software library 230 of another of the VMs 110, the verification section 330 verifies the authenticity of the VM software library 230 of the VM 110 without re-using a verification result of the common software library 210. For example, when a decision is made not to re-use a verification result of the common software library 210, the verification section 330 uses the security module 20G to verify the authenticity of the VM software library 230 of the VM 110 and of the common software library 210.

When a decision is made to re-use a verification result of the common software library 210, the verification section 330 uses the security module 20G to verify the authenticity of the VM software library 230 of the VM 110 and skips verification of the common software library 210.

When a decision is made not to conduct verification of the VM software library 230, the verification section 330 skips verification of the VM software library 230 of the VM 110 and verification of the common software library 210.

For each VM 110, when verification of the authenticity of the VM software library 230 of the VM 110 and of the common software library 210 is successful, the startup section 340 loads the VM software library 230 of the VM 110 and the common software library 210 into the RAM 20C and starts the VM 110.

—Flow of Control—

Figure 3:
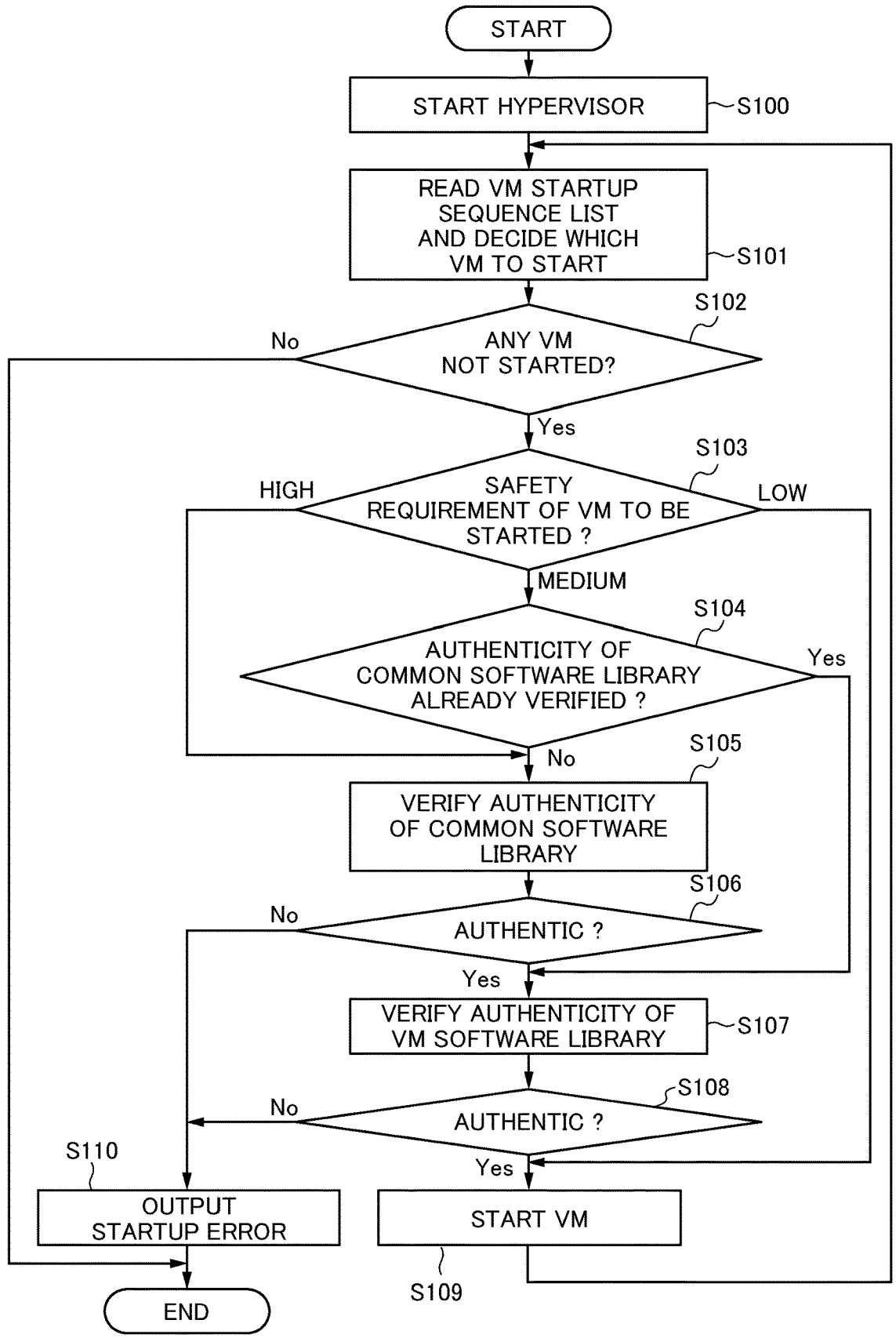
FIG. 3 is a flowchart showing a flow of startup processing according to the first exemplary embodiment.

An example of a flow of startup processing that is executed by the control device 10 according to the present exemplary embodiment is described with the flowchart in FIG. 3.

In step S100 of FIG. 3, the CPU 20A starts software that serves as a hypervisor.

In step S101, the startup VM determination section 310 determines which VM 110 is to start, in accordance with the startup sequence designated by the VM startup sequence list 220, and acquires the system safety requirement levels of that VM 110.

In step S102, the startup VM determination section 310 makes a determination as to whether there is any VM 110 that has not started. When the determination in step S101 has identified a VM 110 to be started, the CPU 20A proceeds to step S103. On the other hand, when the determination in step S101 has identified no VM 110 to be started, the CPU 20A ends the startup processing.

In step S103, the re-use determination section 320 makes a determination as to whether the system safety requirement level of the VM 110 to be started is High, Medium or Low. When the system safety requirement level of the VM 110 to be started is High, the CPU 20A proceeds to step S105. When the system safety requirement level of the VM 110 to be started is Medium, the CPU 20A proceeds to step S104. When the system safety requirement level of the VM 110 to be started is Low, the CPU 20A proceeds to step S109.

In step S104, the re-use determination section 320 makes a determination as to whether the common software library 210 has been verified in the verification of another of the VMs 110. When the common software library 210 has been verified in the verification of another of the VMs 110, the re-use determination section 320 determines that a verification result for the common software library 210 is to be re-used, and the CPU 20A proceeds to step S107. When the common software library 210 has not been verified in the verification of another of the VMs 110, the CPU 20A proceeds to step S105.

In step S105, the verification section 330 uses the security module 20G to verify the authenticity of the common software library 210.

In step S106, the verification section 330 makes a determination as to whether a verification result from step S105 is a result verifying that the common software library 210 is authentic. When the verification result from step S105 is a result verifying that the common software library 210 is not authentic, the CPU 20A proceeds to step S110, outputs a startup error, and ends the startup processing. When the verification result from step S105 is a result verifying that the common software library 210 is authentic, the CPU 20A proceeds to step S107.

In step S107, the verification section 330 uses the security module 20G to verify the authenticity of the VM software library 230 of the VM 110.

In step S108, the verification section 330 makes a determination as to whether a verification result from step S107 is a result verifying that the VM software library 230 is authentic. When the verification result from step S107 is a result verifying that the VM software library 230 is not authentic, the CPU 20A proceeds to step S110. When the verification result from step S107 is a result verifying that the VM software library 230 is authentic, the CPU 20A proceeds to step S109.

In step S109, the startup section 340 loads the VM software library 230 of the VM 110 being started and the common software library 210 into the RAM 20C and starts the VM 110, and the CPU 20A returns to step S101.

Figure 4:
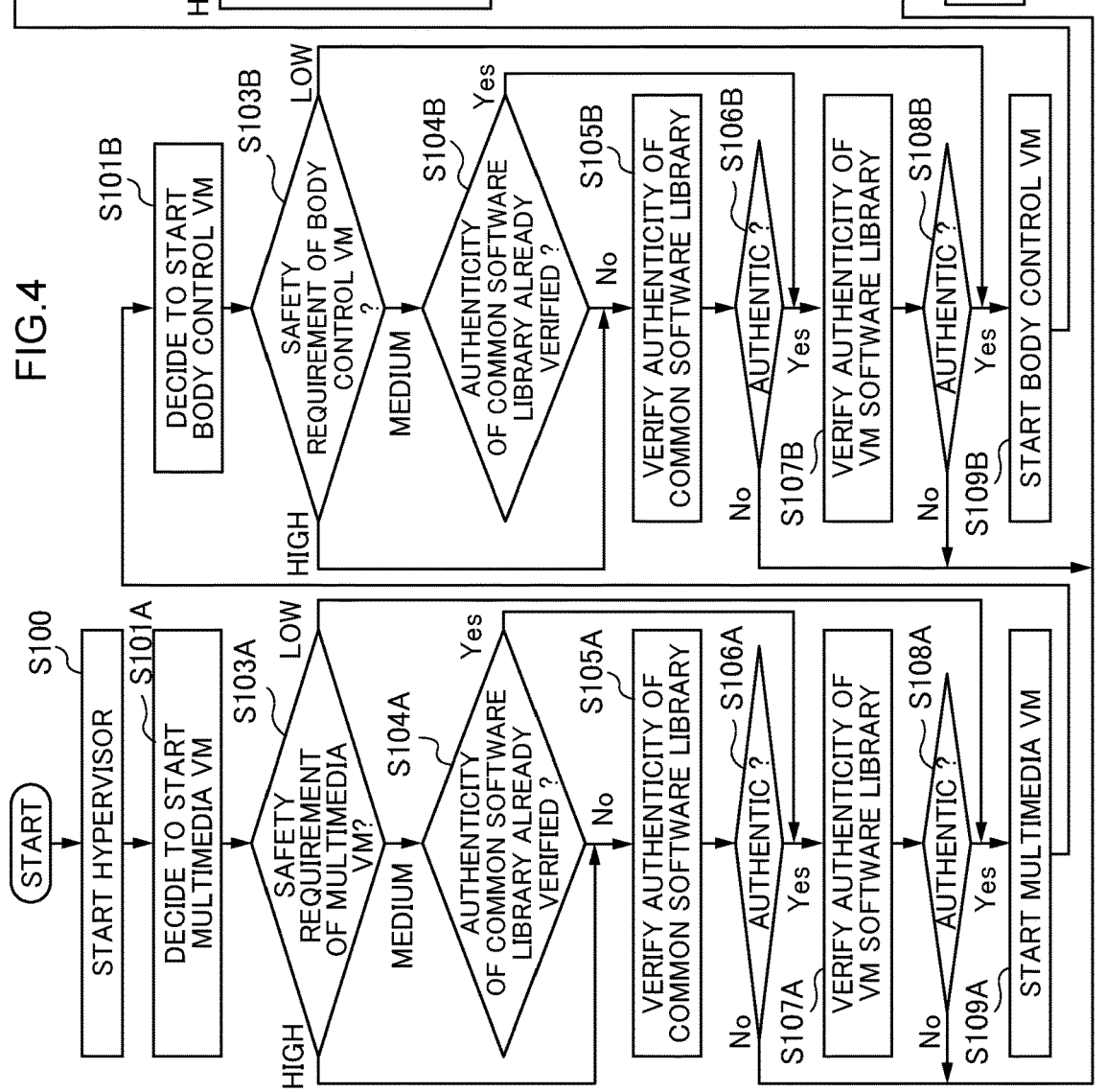
FIG. 4 is a flowchart showing a flow of the startup processing according to the first exemplary embodiment (a specific example of FIG. 3)

A specific example of flow of the startup processing executed by the control device 10 is described with the flowchart in FIG. 4. Here, an example is described in which the VM startup sequence list 220 designates starting the multimedia VM 110A, the body control VM 110B and the autonomous driving control VM 110C in this order.

In step S101A to step S109A, processing the same as in step S101 to step S109 of FIG. 3 described above is executed with the multimedia VM 110A being the VM 110 to be started. Because the system safety requirement level of the multimedia VM 110A is Low, in step S103A, the system safety requirement level of the multimedia VM 110A being started is determined to be Low. Thus, the CPU 20A proceeds to step S109A without verifying the authenticity of either of the multimedia VM software library 230A and the common software library 210.

In step S101B to step S109B, processing the same as in step S101 to step S109 of FIG. 3 described above is executed with the body control VM 110B being the VM 110 to be started. Because the system safety requirement level of the body control VM 110B is High, in step S103B, the system safety requirement level of the body control VM 110B being started is determined to be High. Thus, the CPU 20A verifies the authenticity of both the body control VM software library 230B and the common software library 210 in step S105B and step S107B.

In step S101C to step S109C, processing the same as in step S101 to step S109 of FIG. 3 described above is executed with the autonomous driving control VM 110C being the VM 110 to be started. Because the system safety requirement level of the autonomous driving control VM 110C is Medium, in step S103C, the system safety requirement level of the autonomous driving control VM 110C being started is determined to be Medium. In step S104C, the CPU 20A determines that the common software library 210 has already been verified in the verification of the body control VM 110B, and proceeds to step S107C. In step S107C, the CPU 20A verifies the authenticity of the autonomous driving control VM software library 230C.

—Summary of the First Exemplary Embodiment—

In the control device 10 according to the present exemplary embodiment, a duration needed for verifying the software libraries of a plural number of VMs may be shortened by re-use of a result of verification of a common software library shared by the plural VMs.

In the control device 10 according to the present exemplary embodiment, shortening the duration needed for verifying the software of the plural VMs may be compatible with the functional safety of equipment controlled by the VMs.

In the control device 10 according to the present exemplary embodiment, in order to assure safety at a time of malfunction of the ECU, it is verified when the ECU is starting up that the software libraries of the VMs have not been tampered with. Under particular conditions, verification of the common software library is understood to have been carried out during the startup of the ECU and a startup duration may be shortened. However, whether or not to repeat the verification is decided in accordance with the levels of safety needed for the VMs. Thus, safety of the system may be assured.

Regarding a VM whose system safety requirement level is high, hazards to people, damage to objects and the like may be caused by system problems. Thus, before the VM is started, the ECU 20 uses the security module to verify that the VM software library 230 and common software library 210 configuring that VM have not been tampered with in any respect. In contrast, for a VM that does not require system safety, which is to say a VM with no possibility of hazards to people, damage to objects and the like resulting from system problems, verification of authenticity of the software of the VM is not necessary. Therefore, in order to shorten the VM startup duration, verification of the authenticity of the software libraries is not conducted.

Second Exemplary Embodiment

In the first exemplary embodiment, the ROM 20B is provided at the ECU 20. In contrast, the second exemplary embodiment differs from the first exemplary embodiment in that the ROM 20B is not provided at the ECU 20. Below, differences from the first exemplary embodiment are described. The same reference symbols are applied to structures that are the same, and descriptions thereof are not given.

Figure 5:
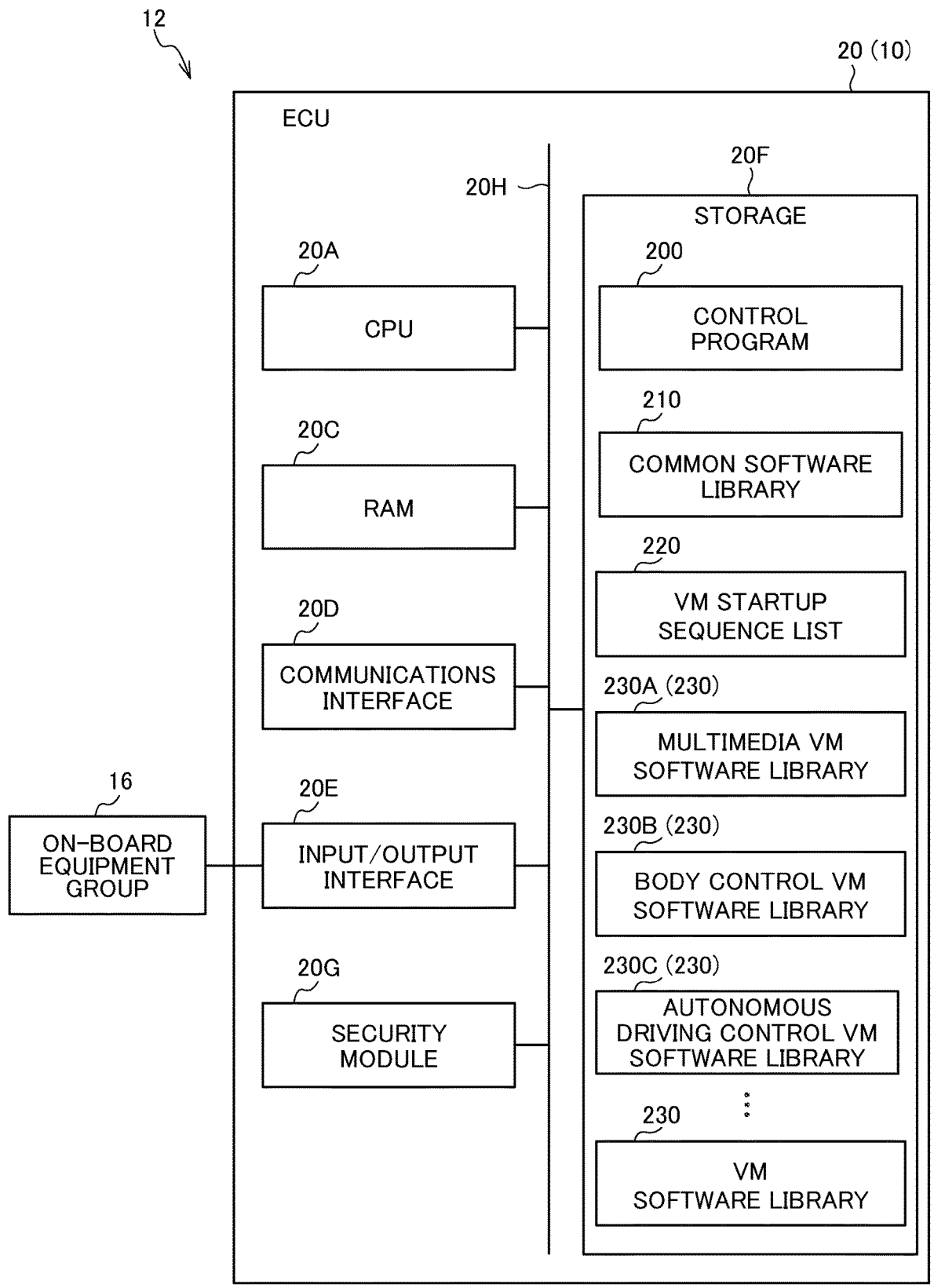
FIG. 5 is a block diagram showing an example of functional structures of a vehicle according to a second exemplary embodiment.

As shown in FIG. 5, the ECU 20 according to the present exemplary embodiment includes the CPU 20A, the RAM 20C, the communications interface 20D, the input/output interface 20E, the storage 20F and the security module 20G.

The control program 200 and the common software library 210 are memorized at the storage 20F.

The present exemplary embodiment too may provide the same operational effects as the first exemplary embodiment.

Third Exemplary Embodiment

In the first exemplary embodiment, the storage 20F is provided at the ECU 20. In contrast, the third exemplary embodiment differs from the first exemplary embodiment in that the storage 20F is not provided at the ECU 20. Below, differences from the first exemplary embodiment are described. The same reference symbols are applied to structures that are the same, and descriptions thereof are not given.

Figure 6:
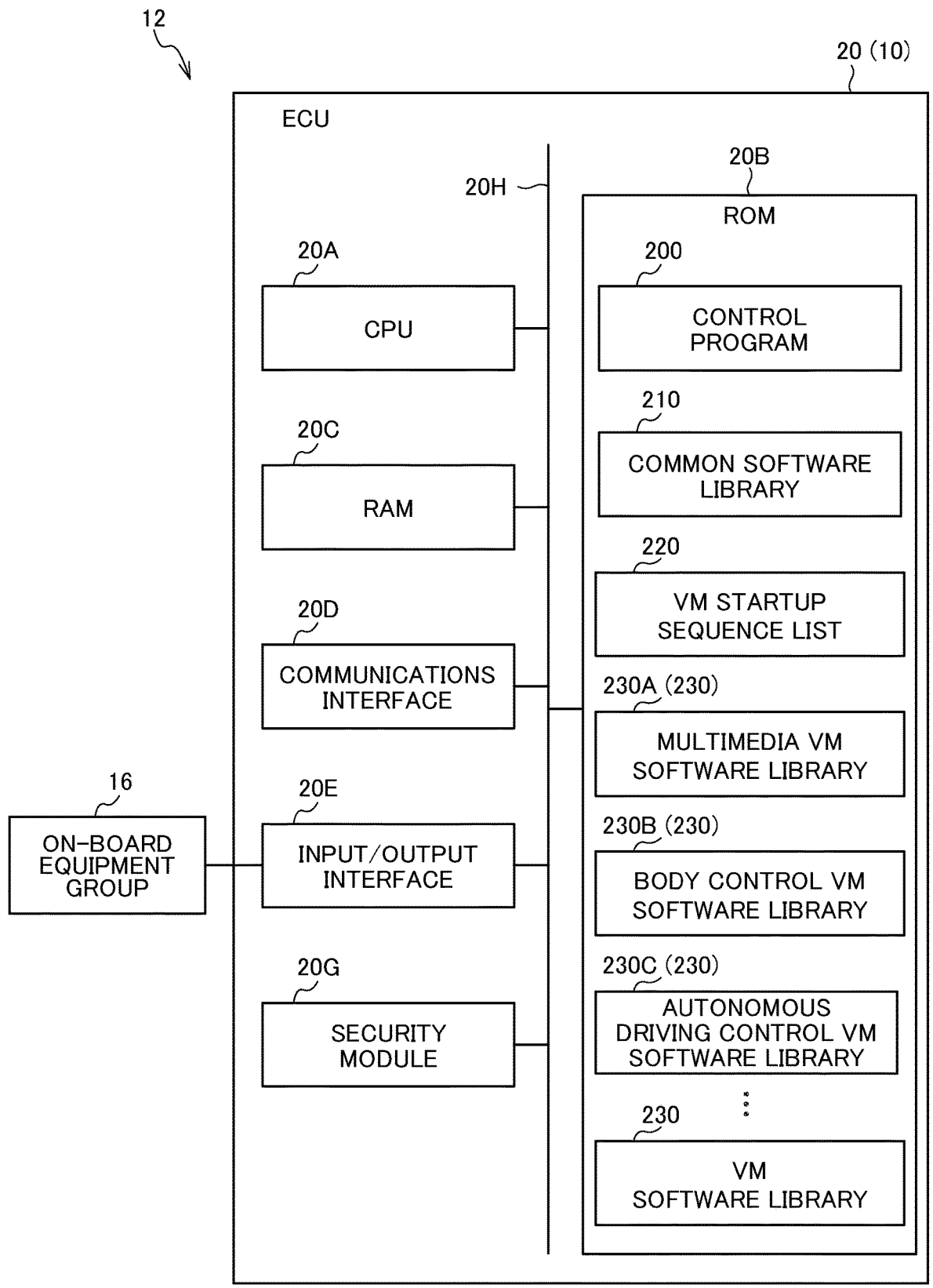
FIG. 6 is a block diagram showing an example of functional structures of a vehicle according to a third exemplary embodiment.

As shown in FIG. 6, the ECU 20 according to the present exemplary embodiment includes the CPU 20A, the ROM 20B, the RAM 20C, the communications interface 20D, the input/output interface 20E and the security module 20G.

The VM startup sequence list 220 and the two or more VM software libraries 230 are memorized at the ROM 20B.

The present exemplary embodiment too may provide the same operational effects as the first exemplary embodiment.

Fourth Exemplary Embodiment

Compared with the first exemplary embodiment, the fourth exemplary embodiment differs from the first exemplary embodiment in that an electrically erasable and programmable read-only memory (EEPROM) 420B is provided instead of the ROM 20B. Below, differences from the first exemplary embodiment are described. The same reference symbols are applied to structures that are the same, and descriptions thereof are not given.

Figure 7:
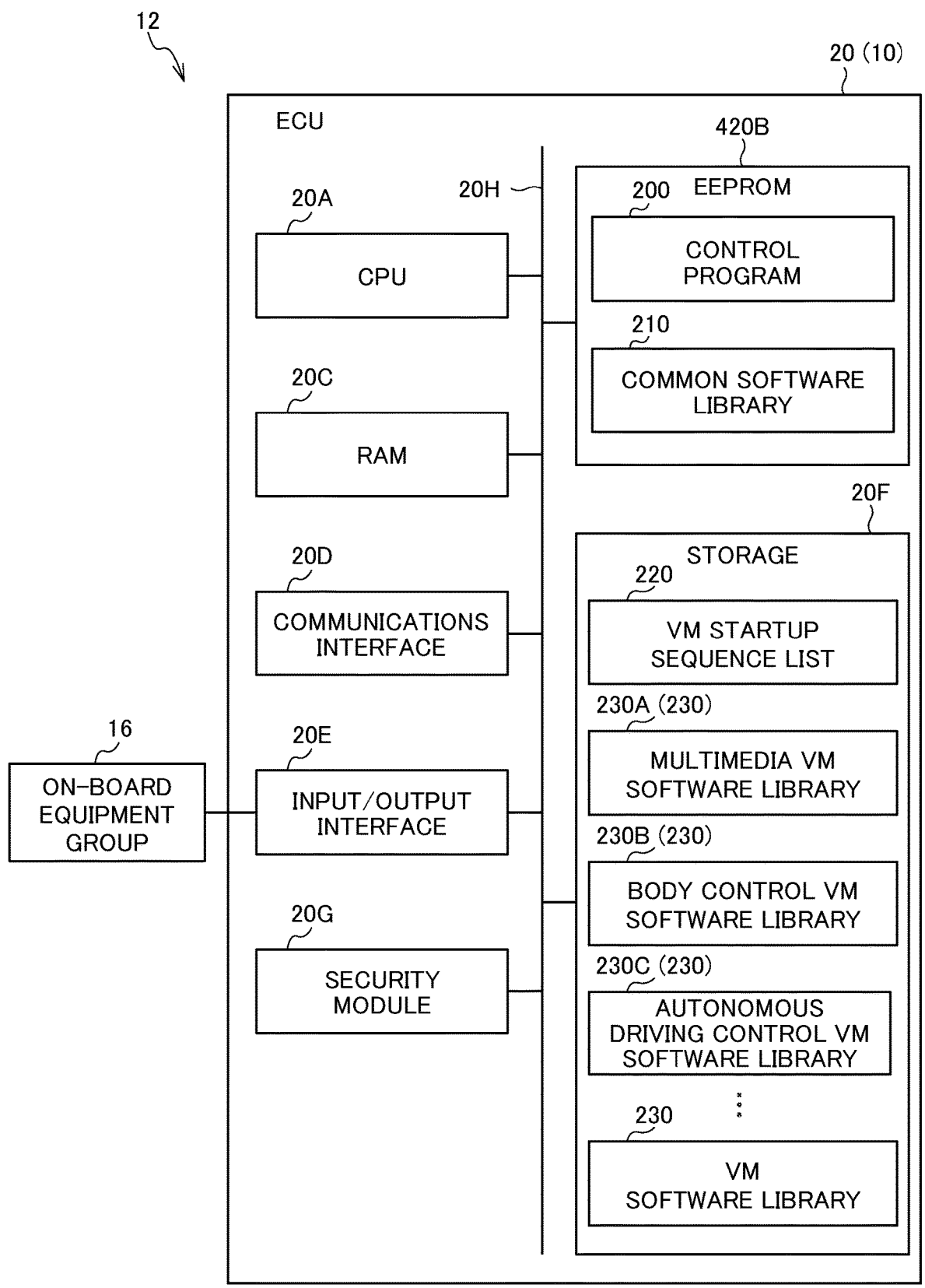
FIG. 7 is a block diagram showing an example of functional structures of a vehicle according to a fourth exemplary embodiment.

As shown in FIG. 7, the ECU 20 according to the present exemplary embodiment includes the CPU 20A, the EEPROM 420B, the RAM 20C, the communications interface 20D, the input/output interface 20E, the storage 20F and the security module 20G.

The control program 200 and the common software library 210 are memorized at the EEPROM 420B.

The present exemplary embodiment too may provide the same operational effects as the first exemplary embodiment.

Fifth Exemplary Embodiment

The fifth exemplary embodiment differs from the first exemplary embodiment in that a security module 201 is provided at the ECU 20 in addition to the security module 20G. Below, differences from the first exemplary embodiment are described. The same reference symbols are applied to structures that are the same, and descriptions thereof are not given.

—Structures—

Figure 8:
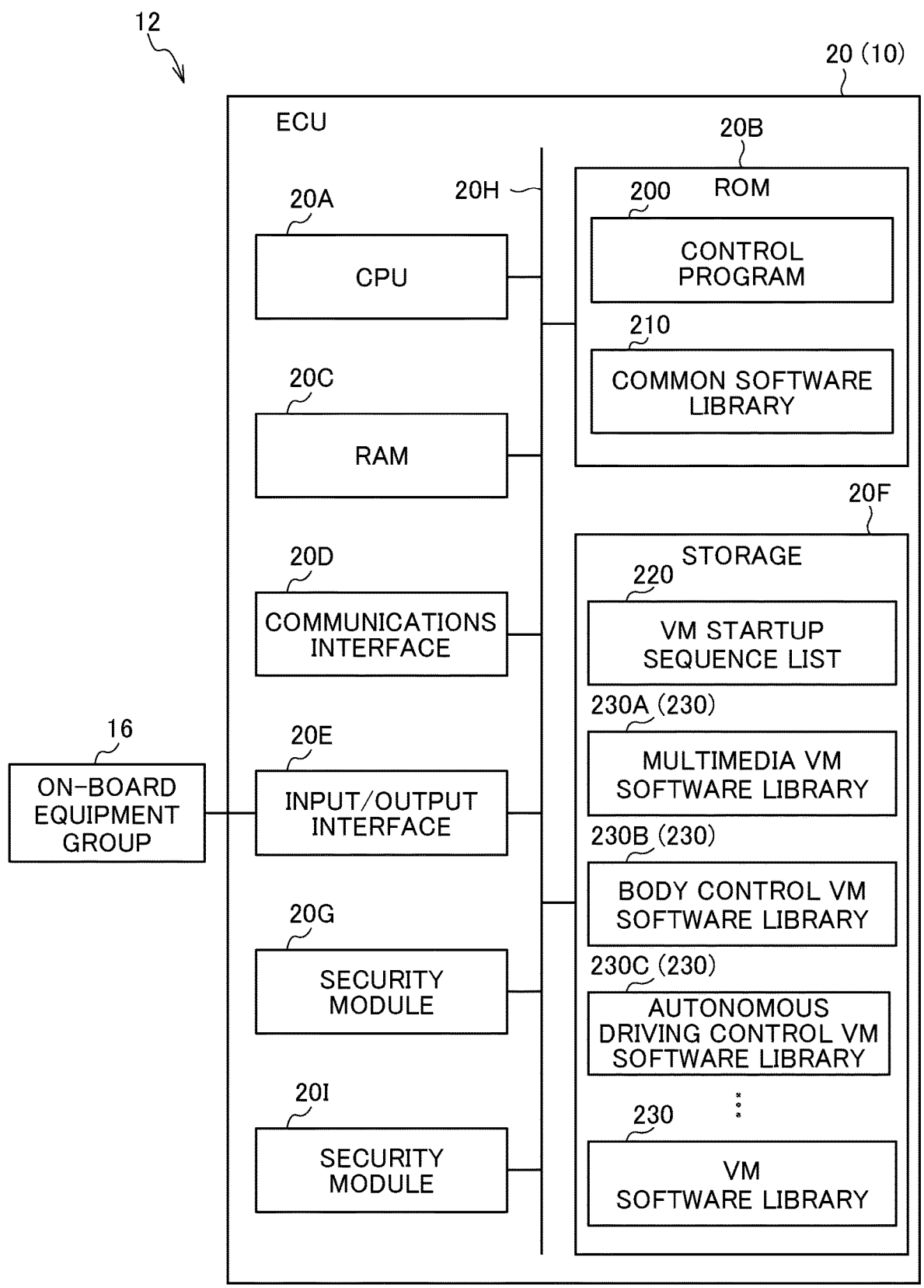
FIG. 8 is a block diagram showing an example of functional structures of a vehicle according to a fifth exemplary embodiment.

As shown in FIG. 8, the ECU 20 according to the present exemplary embodiment includes the CPU 20A, the ROM 20B, the RAM 20C, the communications interface 20D, the input/output interface 20E, the storage 20F, the security module 20G and the security module 201.

When the software of plural VMs is being started, the verification section 330 uses the security module 20G and the security module 201 to verify the authenticity of the software of the VMs in parallel.

—Flow of Control—

Figure 9:
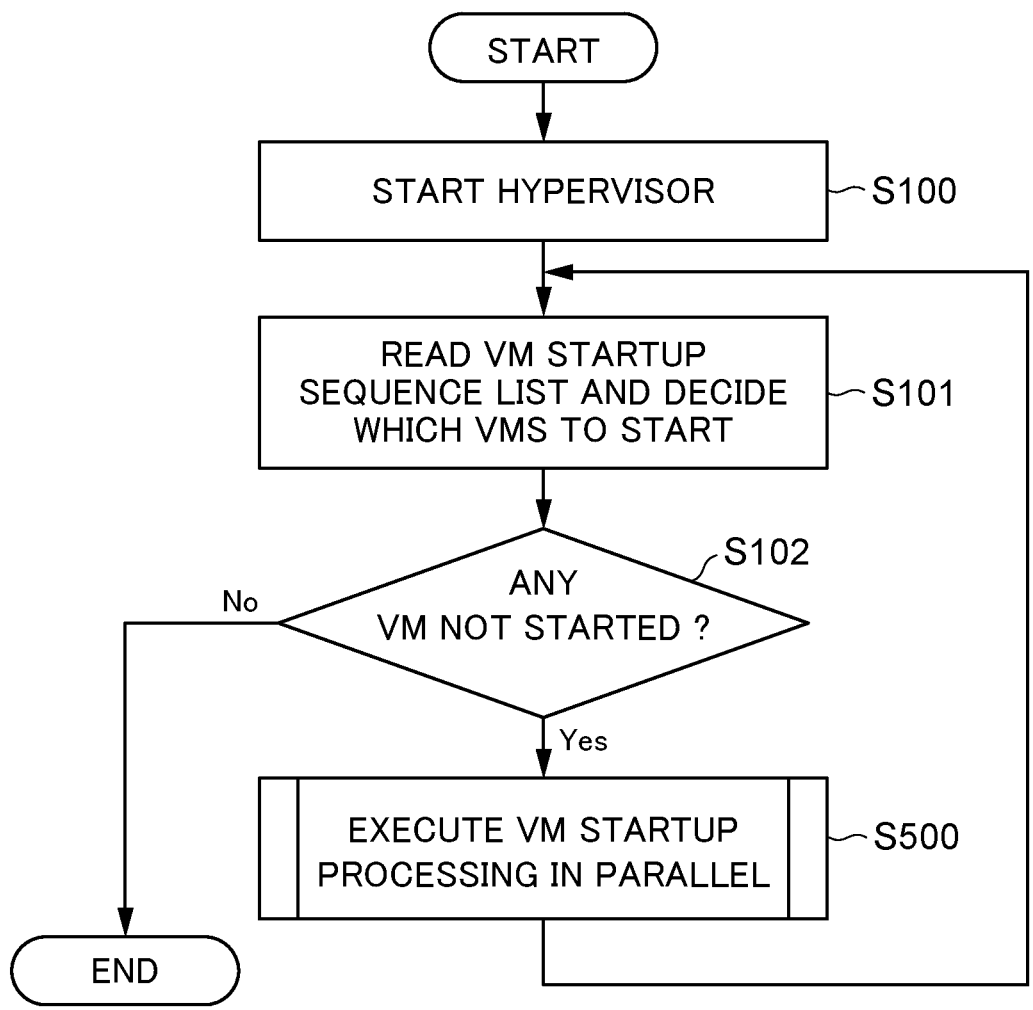
FIG. 9 is a flowchart showing a flow of startup processing according to the fifth exemplary embodiment.

An example of flow of the startup processing executed by the control device 10 according to the present exemplary embodiment is described with the flowchart of FIG. 9. Processing that is the same as in the exemplary embodiments described above is assigned the same reference symbols, and descriptions thereof are not given.

In step S100 of FIG. 9, the CPU 20A starts the software that is the hypervisor.

In step S101, the startup VM determination section 310 determines which VMs 110 are to start, in accordance with the startup sequence designated by the VM startup sequence list 220, and acquires the system safety requirement levels of those VMs 110. In this case, the startup VM determination section 310 identifies two of the VMs 110 to be started.

In step S102, the startup VM determination section 310 makes a determination as to whether there is any VM 110 that has not started. When the determination in step S101 has identified a VM 110 to be started, the CPU 20A proceeds to step S500. On the other hand, when the determination in step S101 has identified no VM 110 to be started, the CPU 20A ends the startup processing.

In step S500, the CPU 20A executes verification processing of the two VMs 110 being started in parallel. That is, in step S500, the CPU 20A uses the security module 20G and the security module 201 to execute processing similar to step S103 to step S110 of FIG. 3 for each of the two VMs 110 being started. Then, the CPU 20A returns to step S101.

The present exemplary embodiment too may provide the same operational effects as the first exemplary embodiment.

Further parallelization of startups of the VMs 110 is possible. Thus, the duration of startup of the VMs may be shortened while assuring safety.

=Remarks=

In the fifth exemplary embodiment described above, an example is described in which startups of the VMs 110 are conducted in parallel, but this is not limiting. Verifications of the authenticity of software libraries may be conducted in parallel. An example of the flow of startup processing executed by the control device 10 in this case is described with the flowchart of FIG. 10. Processing that is the same as in the exemplary embodiments described above is assigned the same reference symbols, and descriptions thereof are not given.

Figure 10:
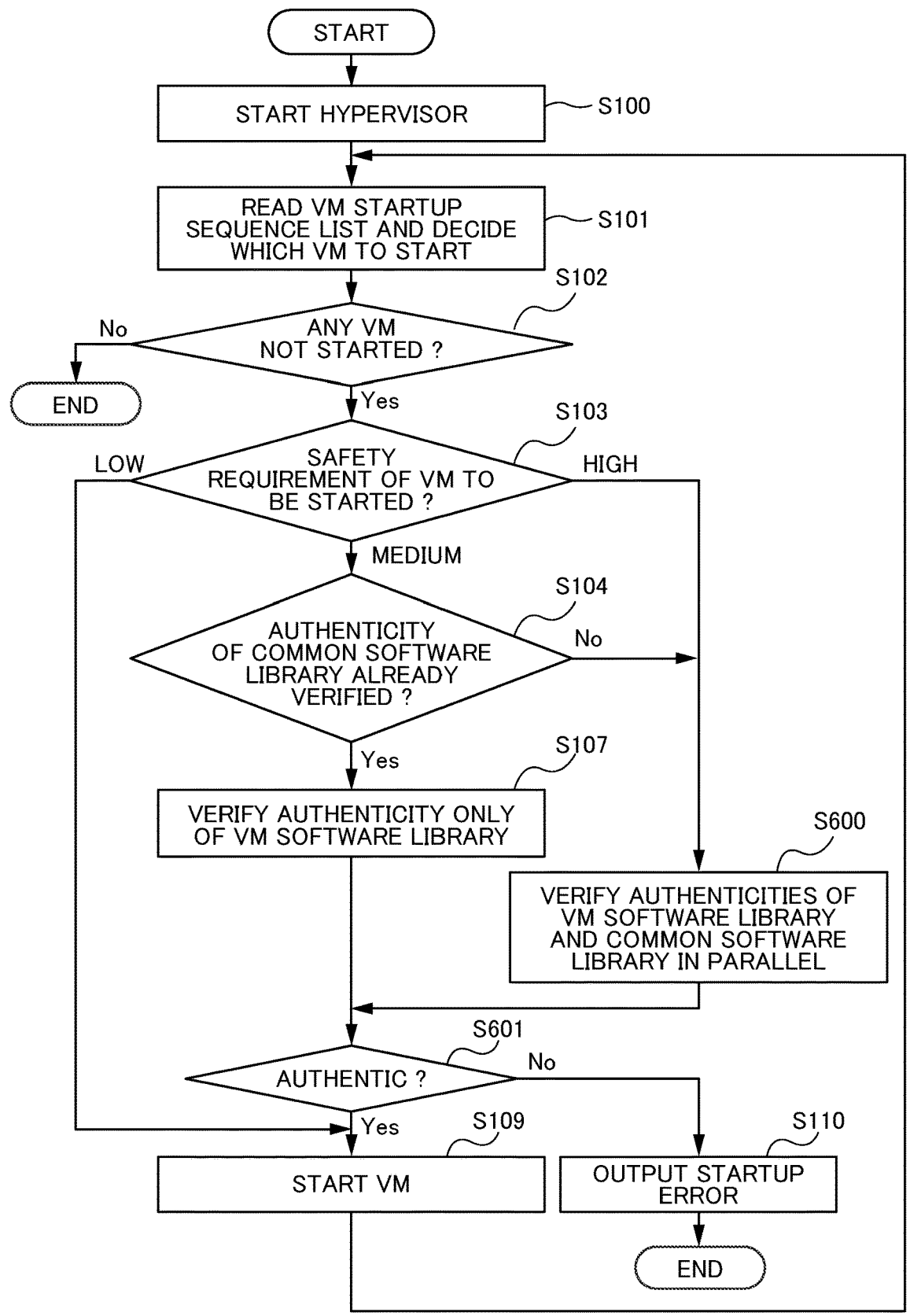
FIG. 10 is a flowchart showing a flow of startup processing according to an alternative example of the fifth exemplary embodiment.

In step S104 of FIG. 10, the re-use determination section 320 makes a determination as to whether the common software library 210 has been verified in the verification of another of the VMs 110. When the common software library 210 has been verified in the verification of another of the VMs 110, the re-use determination section 320 determines that a verification result for the common software library 210 is to be re-used, and the CPU 20A proceeds to step S107. When the common software library 210 has not been verified in the verification of another of the VMs 110, the CPU 20A proceeds to step S600.

In step S600, the verification section 330, in parallel, uses the security module 20G to verify the authenticity of the VM software library 230 and uses the security module 201 to verify the authenticity of the common software library 210.

In step S601, the verification section 330 makes a determination as to whether a verification result from step S107 or step S600 is a result verifying that the VM software library 230 is authentic. When the verification result from step S107 or step S600 is a result verifying that the library/ies is/are not authentic, the CPU 20A proceeds to step S110. On the other hand, when the verification result from step S107 or step S600 is a result verifying that the library/ies is/are authentic, the CPU 20A proceeds to step S109.

In the exemplary embodiments described above, system safety requirement levels are set in three levels—High, Medium and Low—but the system safety requirement levels may be divided more finely in accordance with the characteristics of an ECU, safety requirements and so forth. In ISO 26262, ASIL is set in five levels, four levels from A to D and non-hazardous. Whether or not to re-use a verification result of the common software library 210 may be decided in accordance with these five levels.

In the exemplary embodiments described above, examples are described in which the authenticities of both the VM software library 230 and the common software library 210 are verified when a VM with the highest safety requirement level is being started, but this is not limiting. If the safety requirement levels are more finely divided, the authenticities of both the VM software library 230 and the common software library 210 may be verified also when a VM with the second highest level is being started.

Figure 11:
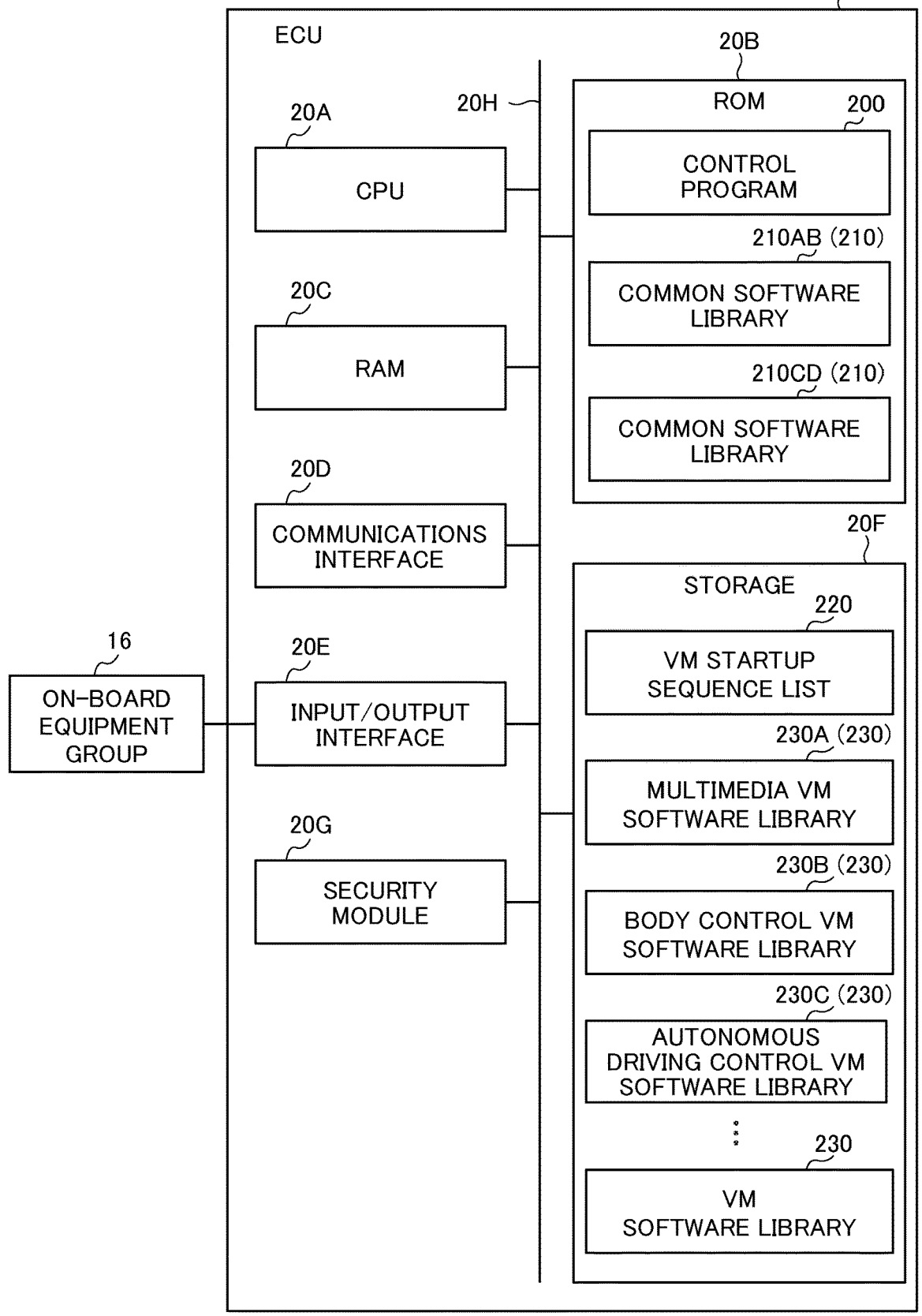
FIG. 11 is a block diagram showing an example of functional structures of a vehicle according to an alternative example of the exemplary embodiments.

The exemplary embodiments described above are illustrated with only the one common software library 210 but, depending on the details of the VMs to be started, a plural number of the common software library 210 may be present. In this situation, as illustrated in FIG. 11, the ROM 20B memorizes a common software library 210AB and a common software library 210CD. For example, the common software library 210AB is shared by the multimedia VM 110A and the body control VM 110B, and the common software library 210CD is shared by the autonomous driving control VM 110C and others of the VMs 110. Accordingly, information on the common software library/ies 210 associated with each VM 110 must be designated for that VM 110. Moreover, the VM configuration section 300 must memorize which common software library 210 is to be verified for authenticity at which system safety requirement level when the VMs are being started.

Figure 12:
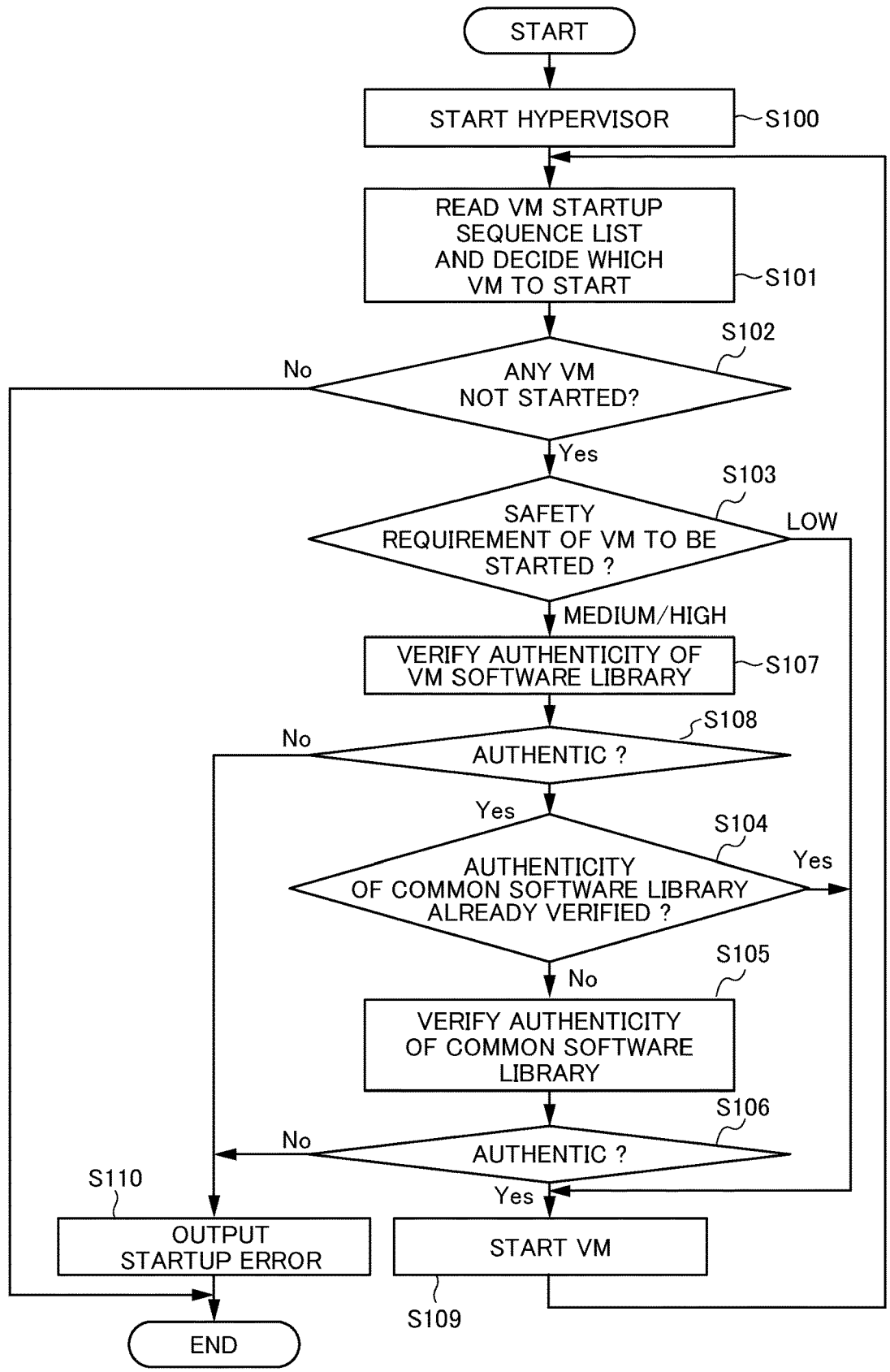
FIG. 12 is a flowchart showing a flow of startup processing according to the alternative example of the exemplary embodiments.

In the exemplary embodiments described above, examples are described in which the authenticity of the common software library 210 is verified and subsequently the authenticity of the VM software library 230 is verified, but this is not limiting. The order of verifying the authenticity of the common software library 210 and verifying the authenticity of the VM software library 230 may be switched, in which case, as illustrated in FIG. 12, the re-use determination section 320 makes the determination in step S103 as to whether the system safety requirement level of the VM 110 being started is High, Medium or Low. When the system safety requirement level of the VM 110 being started is Medium or High, the CPU 20A proceeds to step S107. When the system safety requirement level of the VM 110 being started is Low, the CPU 20A proceeds to step S109.

In step S107, the verification section 330 uses the security module 20G to verify the authenticity of the VM software library 230 of the VM 110.

In step S108, the verification section 330 makes a determination as to whether a verification result from step S107 is a result verifying that the VM software library 230 is authentic. When the verification result from step S107 is a result verifying that the VM software library 230 is not authentic, the CPU 20A proceeds to step S110, outputs a startup error, and ends the startup processing. When the verification result from step S107 is a result verifying that the VM software library 230 is authentic, the CPU 20A proceeds to step S104.

In step S104, the re-use determination section 320 makes a determination as to whether the common software library 210 has been verified in the verification of another of the VMs 110. When the common software library 210 has been verified in the verification of another of the VMs 110, the re-use determination section 320 determines that the verification result for the common software library 210 is to be re-used, and the CPU 20A proceeds to step S109. When the common software library 210 has not been verified in the verification of another of the VMs 110, the CPU 20A proceeds to step S105.

In step S105, the verification section 330 uses the security module 20G to verify the authenticity of the common software library 210.

In step S106, the verification section 330 makes a determination as to whether a verification result from step S105 is a result verifying that the common software library 210 is authentic. When the verification result from step S105 is a result verifying that the common software library 210 is not authentic, the CPU 20A proceeds to step S110. When the verification result from step S105 is a result verifying that the common software library 210 is authentic, the CPU 20A proceeds to step S109.

In the exemplary embodiments described above, examples are described in which the safety requirement level is used as the index assigned to the VMs 110, but this is not limiting. An index assigned to the VMs 110 may be, for example, an index assigning security levels of the software of the VMs 110. In this case, when the software security level is high, the CPU 20A determines that a verification result of authenticity of the common software library 210 obtained in the verification of another of the VMs 110 is to be re-used. On the other hand, when the software security level is low, the CPU 20A verifies the authenticity of the VM software library 230 of the VM 110 and the common software library 210 without re-using a verification result of authenticity of the common software library 210 obtained in verification of another of the VMs 110.

In the exemplary embodiments described above, examples are described in which the authenticities of the VM software libraries 230 of the VMs 110 and the common software library 210 are verified, but this is not limiting. For example, the suitability of providers of the VM software libraries 230 of the VMs 110 and the common software library 210 may be verified.

In the exemplary embodiments described above, examples are described in which the VMs 110 are started in accordance with the VM startup sequence list 220, but this is not limiting. A startup sequence of the VMs 110 may be fixed in the control program 200, in which case there is no need to determine which VM 110 to start in the startup processing. Alternatively, rather than using the VM startup sequence list 220, the startup VM determination section 310 may scan the VM software libraries 230 in the storage 20F or ROM 20B and decide on a startup sequence of the VMs 110.

In the exemplary embodiments described above, the CPU 20A reads and executes software (programs) but this processing may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiments described above, modes are described in which a program is memorized in advance (installed) on a computer readable non-transitory recording medium. For example, the control program 200 of the ECU 20 is memorized in advance at the ROM 20B. However, this is not limiting and a program may be memorized at storage such as a hard disk drive (HDD), SSD or the like. Further, a program may be provided in a mode of being recorded on a non-transitory recording medium such as a CD-ROM (compact disc read-only memory), DVD-ROM (digital versatile disc read-only memory), USB (universal serial bus) memory or the like. Modes are also possible in which a program is downloaded from external equipment via a network.

The flows of processing described in the above exemplary embodiments are examples. Unnecessary steps may be removed, new steps may be added, and processing sequences may be rearranged within a scope not departing from the gist of the disclosure.

What is claimed is:

1. A vehicle control device comprising:
a random access memory (RAM);
a memory separate from the RAM; and
a processor coupled to the memory and the RAM,
the memory storing:
virtual machine (VM) software, which is software of a plurality of VMs that control equipment installed at a vehicle, and
common software that is shared by at least two of the VMs, and the processor being configured to:
verify VM software of one of the VMs;
in verifying the VM software of the one VM, re-use a verification result of the common software in accordance with an index assigned beforehand to the one VM, the verification result being obtained in verification of VM software of another of the VMs; and
after the verifying, load the VM software of the one VM and the common software from the memory into the RAM for execution by the processor to start the one VM.

2. The vehicle control device according to claim 1, wherein the processor is further configured to:
when verifying the VM software of the one VM, decide whether or not to re-use the verification result of the common software obtained in the verification of the VM software of the other VM in accordance with the index assigned beforehand to the one VM;
when the processor decides to re-use the verification result of the common software obtained in the verification of the VM software of the other VM, re-use the verification result of the common software obtained in the verification of the VM software of the other VM and verify the VM software of the one VM; and
when the processor decides not to re-use the verification result of the common software obtained in the verification of the VM software of the other VM, verify the VM software of the one VM and verify the common software.

3. The vehicle control device according to claim 1, wherein the processor is configured to verify authenticity of the VM software of the VMs.

4. The vehicle control device according to claim 1, wherein the processor is configured to verify the VM software of the VMs when starting the VM software of the plurality of VMs.

5. The vehicle control device according to claim 1, wherein the index is one of a functional safety index relating to functional safety of equipment controlled by the one VM or a security index relating to security of the VM software of the one VM.

6. The vehicle control device according to claim 1, wherein
the memory comprises a read-only memory (ROM) that stores the common software, and another memory that stores the VM software.

7. The vehicle control device according to claim 6, wherein
the another memory is at least one of a ROM, a hard disk, a flash drive, a solid-state drive (SSD), an embedded multimedia card (eMMC), and a secure digital (SD).

8. A vehicle control method comprising verification processing executed by a computer including a random access memory (RAM), and a memory section separate from the RAM,
the memory section storing:
virtual machine (VM) software, which is software of a plurality of VMs that control equipment installed at a vehicle, and
common software that is shared by at least two of the VMs, and the verification processing comprising:
verifying VM software of one of the VMs, the verifying including re-using a verification result of the common software in accordance with an index assigned beforehand to the one VM, the verification result being obtained in verification of VM software of another of the VMs; and
after the verifying, loading the VM software of the one VM and the common software from the memory into the RAM for execution by the computer to start the one VM.

9. The vehicle control method according to claim 8, wherein
the memory section comprises a read-only memory (ROM) that stores the common software, and another memory that stores the VM software.

10. The vehicle control method according to claim 9, wherein
the another memory is at least one of a ROM, a hard disk, a flash drive, a solid-state drive (SSD), an embedded multimedia card (eMMC), and a secure digital (SD).

11. A non-transitory recording medium recording a control program executable by a computer to execute processing,
the computer including a random access memory (RAM), and a memory section separate from the RAM,
the memory section storing:
virtual machine (VM) software, which is software of a plurality of VMs that control equipment installed at a vehicle, and
common software that is shared by at least two of the VMs, and the processing comprising:
verifying VM software of one of the VMs, the verifying including re-using a verification result of the common software in accordance with an index assigned beforehand to the one VM, the verification result being obtained in verification of VM software of another of the VMs; and
after the verifying, loading the VM software of the one VM and the common software from the memory into the RAM for execution by the computer to start the one VM.

12. The non-transitory recording medium according to claim 11, wherein
the memory section comprises a read-only memory (ROM) that stores the common software, and another memory that stores the VM software.

13. The non-transitory recording medium according to claim 12, wherein
the another memory is at least one of a ROM, a hard disk, a flash drive, a solid-state drive (SSD), an embedded multimedia card (eMMC), and a secure digital (SD).

* * * * *